US009755902B2

(12) United States Patent
Chen et al.

(10) Patent No.: US 9,755,902 B2
(45) Date of Patent: Sep. 5, 2017

(54) DYNAMIC SYSTEM CONFIGURATION BASED ON CLOUD-COLLABORATIVE EXPERIMENTATION

(71) Applicant: VIA TECHNOLOGIES, INC., New Taipei (TW)

(72) Inventors: Wen-Chi Chen, New Taipei (TW); Rodney E. Hooker, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 213 days.

(21) Appl. No.: 14/474,623

(22) Filed: Sep. 2, 2014

(65) Prior Publication Data

US 2015/0341218 A1 Nov. 26, 2015

Related U.S. Application Data

(60) Provisional application No. 62/000,808, filed on May 20, 2014.

(51) Int. Cl.
*H04L 12/24* (2006.01)
*G06F 15/177* (2006.01)

(52) U.S. Cl.
CPC ........ *H04L 41/0833* (2013.01); *G06F 15/177* (2013.01); *H04L 41/0806* (2013.01)

(58) Field of Classification Search
CPC H04L 41/0833; H04L 41/0806; G06F 15/177
(Continued)

(56) References Cited

U.S. PATENT DOCUMENTS 5,671,442 A 9/1997 Feeney et al.
6,240,468 B1 5/2001 Capelli
(Continued)

FOREIGN PATENT DOCUMENTS

CN 1599899 3/2005
EP 1449095 A1 8/2004
(Continued)

OTHER PUBLICATIONS

"Buffer Overflow" Wikipedia, the free encyclopedia. Downloaded on Sep. 5, 2013 from http://en.wikipedia.org/wiki/Buffer_overflow. pp. 1-12.
(Continued)

*Primary Examiner* — Brian J Gillis
*Assistant Examiner* — Steve Lin
(74) *Attorney, Agent, or Firm* — E. Alan Davis; Eric W. Cernyar; James W. Huffman

(57) ABSTRACT

A server includes a first module that receives information from a plurality of systems. Each system of the plurality of systems includes functional units that are dynamically configurable during operation of the system. The information from each system of the plurality of systems includes performance data collected while executing a program when the functional units are configured according to a configuration setting respective to the system. The server also includes a second module that analyzes the received information to select a best-performing configuration setting of the configuration settings received from the plurality of systems. The server also includes a third module that provides a new configuration setting to the plurality of systems. The new configuration setting is a modification of the best-performing configuration. The server iterates on receiving the information from the plurality of systems, analyzing
(Continued)

the received information and providing the new configuration setting to the plurality of systems.

30 Claims, 8 Drawing Sheets

(58) Field of Classification Search
USPC ........................................................ 709/220
See application file for complete search history.

(56) References Cited

U.S. PATENT DOCUMENTS

| | | | |
|---|---|---|---|
| 6,289,396 | B1 | 9/2001 | Keller et al. |
| 6,438,557 | B1 | 8/2002 | Dent |
| 6,732,263 | B1 | 5/2004 | May et al. |
| 6,948,050 | B1 | 9/2005 | Gove et al. |
| 6,957,437 | B1 | 10/2005 | Bogia et al. |
| 7,366,891 | B2 | 4/2008 | Khanna et al. |
| 7,418,582 | B1 | 8/2008 | Iacobovici et al. |
| 7,478,388 | B1 | 1/2009 | Chen et al. |
| 7,558,723 | B2 | 7/2009 | Traut |
| 7,774,531 | B1 | 8/2010 | Karlsson |
| 8,793,482 | B2* | 7/2014 | Francois ............. G06F 9/44505 713/100 |
| 8,983,453 | B1 | 3/2015 | On et al. |
| 9,053,070 | B1* | 6/2015 | Arguelles ............. G06F 15/177 |
| 9,483,393 | B1* | 11/2016 | Suttle ................. G06F 11/3692 |
| 2003/0093686 | A1 | 5/2003 | Barnes et al. |
| 2004/0177269 | A1 | 9/2004 | Belnet et al. |
| 2005/0138449 | A1 | 6/2005 | Katoh et al. |
| 2005/0210454 | A1 | 9/2005 | DeWitt, Jr. et al. |
| 2006/0083170 | A1* | 4/2006 | Silva ..................... H04W 16/18 370/238 |
| 2006/0168590 | A1 | 7/2006 | Khanna et al. |
| 2006/0212609 | A1 | 9/2006 | Zimmer et al. |
| 2007/0043531 | A1 | 2/2007 | Kosche et al. |
| 2007/0226795 | A1 | 9/2007 | Conti et al. |
| 2008/0104363 | A1 | 5/2008 | Raj et al. |
| 2008/0162886 | A1 | 7/2008 | Saha et al. |
| 2008/0163212 | A1 | 7/2008 | Zimmer et al. |
| 2008/0244533 | A1 | 10/2008 | Berg et al. |
| 2009/0119480 | A1 | 5/2009 | Master et al. |
| 2009/0164812 | A1* | 6/2009 | Capps, Jr. ............. G06F 1/3203 713/320 |
| 2010/0011198 | A1* | 1/2010 | Hooker ................. G06F 1/3203 713/1 |
| 2010/0319001 | A1 | 12/2010 | Jones |
| 2011/0022586 | A1* | 1/2011 | Wilkinson ........ G06F 17/30306 707/720 |
| 2011/0099527 | A1 | 4/2011 | Courchesne et al. |
| 2011/0238797 | A1* | 9/2011 | Wee ..................... G06F 9/44505 709/220 |
| 2011/0238920 | A1 | 9/2011 | Hooker et al. |
| 2013/0073829 | A1 | 3/2013 | Gounares et al. |
| 2013/0081005 | A1 | 3/2013 | Gounares et al. |
| 2013/0179674 | A1 | 7/2013 | Im et al. |
| 2013/0311755 | A1 | 11/2013 | Henry et al. |
| 2014/0089248 | A1 | 3/2014 | Lataille et al. |
| 2014/0164600 | A1* | 6/2014 | Archer ................ H04L 43/0882 709/224 |
| 2015/0293582 | A1* | 10/2015 | Popovic .............. H04L 41/0833 713/323 |

FOREIGN PATENT DOCUMENTS

| | | |
|---|---|---|
| EP | 1693753 A2 | 8/2006 |
| TW | 201106262 | 2/2011 |
| TW | 201234271 | 8/2012 |
| WO | WO02073336 | 9/2002 |
| WO | WO2009058412 | 5/2009 |

OTHER PUBLICATIONS

Prabhu, Pratap et al. "Smashing the Stack with Hydra." Downloaded on Sep. 5, 2013 from http://www.cs.columbia.edu/~yingbo/publications/defcon09hydra.pdf. pp. 1-22.

Shmatikov, Vitaly. "Buffer Overflow and Other Memory Corruption Attacks." Downloaded on Sep. 17, 2013 from http://www.cs.utexas.edu/~shmat/courses/cs378/memattacks.pdf. pp. 1-85.

"NOP slide" Wikipedia, the free encyclopedia. Downloaded on Sep. 17, 2013 from http://en.wikipedia.org/wiki/NOP_sled. pp. 1-2.

CLET Team. "Polymorphic Shellcode Engine." PHRACK Magazine. Downloaded Sep. 16, 2013 from http://www.phrack.org/issues.html?issue=61&id=9. pp. 1-24.

Solar Eclipse. "Honeynet Project Scan of the Month for Apr. 2002." Scan 20 by Solar Eclipse. Downloaded Sep. 5, 2013 from http://web.archive.org/web/20110724121400/http://www.phreedom.org/solar/honeynet/scan20/scan20.html. pp. 1-4.

Reinman, Glenn et al. "Using a Serial Cache for Energy Efficient Instruction Fetching." May 10, 2004. Retrieved from the internet: http://www.sciencedirect.com/science/article/pii/S138376210400030X. Retrieved on Jul. 10, 2014 pp. 1-21.

Tarjan, David et al. "Federation: Repurposing Scalar Cores for Out-of-Order Instruction Issue." Jun. 8, 2008. Retrieved from the internet: http://www.cs.virginia.edu/~skadron/papers/federation_dac08.pdf. Retrieved on Jul. 9, 2014. pp. 1-4.

* cited by examiner

DYNAMIC SYSTEM CONFIGURATION BASED ON CLOUD-COLLABORATIVE EXPERIMENTATION

CROSS REFERENCE TO RELATED APPLICATION(S)

This application claims priority based on U.S. Provisional Application Ser. No. 62/000,808, filed May 20, 2014, which is hereby incorporated by reference in its entirety.

BACKGROUND

Microprocessor designers spend much effort on performance analysis. After architecting a microprocessor with a base set of features and performance targets based on previous generations of microprocessors, they execute a representative sample of the software applications that matter most to their customers and capture instruction execution traces of the software applications. They then use the captured traces as stimulus to simulate the operation of the microprocessor being designed. They may configure different characteristics of the simulated microprocessor in an effort to achieve the highest aggregate performance across all of the target software applications. Often, a particular configuration of characteristics is desirable for one target application and undesirable for another. In these cases, the designers make a decision as to which software application is more important, or find another approach that attempts to balance the needs of the multiple software applications. The choice often does not achieve the optimal performance of the target software applications since it may attempt to optimize the performance of one software application at the expense of another software application.

Once the best average set of configuration settings has been identified, the microprocessor designers code them into the design with VHDL or Verilog code, for example. Other microprocessors improve on the hardcoded configuration by including a bank of fuses in the microprocessor that may be selectively blown during manufacturing of the microprocessor to alter the configuration settings from their hardcoded values. This allows the microprocessor a limited degree of optimization in manufacturing, perhaps in response to new software applications or operating systems introduced after the microprocessor was designed. However, this solution still does not achieve the optimal performance of the target software applications in that it requires the designer/manufacturer to choose a configuration optimized for some applications at the expense of other applications, or to choose a balanced configuration that is likely not optimized for any applications.

To address this problem, U.S. Pat. No. 8,566,565, which is hereby incorporated by reference in its entirety for all purposes, describes a microprocessor that may be dynamically configured into multiple operating modes by a device driver based on the currently running applications. Additionally, U.S. patent application Ser. No. 14/050,687, filed Oct. 10, 2013, which claims priority to U.S. Provisional Application No. 61/880,620, filed Sep. 20, 2013, each of which is hereby incorporated by reference in its entirety for all purposes, describes a dynamically reconfigurable microprocessor. However, a need for even greater performance optimization is realized.

BRIEF SUMMARY

In one aspect the present invention provides a server. The server includes a first module that receives information from a plurality of systems. Each system of the plurality of systems includes functional units that are dynamically configurable during operation of the system. The information from each system of the plurality of systems includes performance data collected while executing a program when the functional units are configured according to a configuration setting respective to the system. The server also includes a second module that analyzes the received information to select a best-performing configuration setting of the configuration settings received from the plurality of systems. The server also includes a third module that provides a new configuration setting to the plurality of systems. The new configuration setting is a modification of the best-performing configuration. The server iterates on receiving the information from the plurality of systems, analyzing the received information and providing the new configuration setting to the plurality of systems.

In another aspect, the present invention provides a method. The method includes receiving information from a plurality of systems. Each system of the plurality of systems includes functional units that are dynamically configurable during operation of the system. The information from each system of the plurality of systems includes performance data collected while executing a program when the functional units are configured according to a configuration setting respective to the system. The method also includes analyzing the received information to select a best-performing configuration setting of the configuration settings received from the plurality of systems. The method also includes providing a new configuration setting to the plurality of systems, wherein the new configuration setting is a modification of the best-performing configuration. The method also includes iterating on the receiving, the analyzing and the providing.

In yet another aspect, the present invention provides a method. The method includes receiving information from a plurality of systems. Each system of the plurality of systems includes functional units that are dynamically configurable during operation of the system. The information from each system of the plurality of systems includes performance data collected while executing a program when the functional units are configured according to a configuration setting respective to the system. The method also includes analyzing the received information to determine a best-performing configuration setting of the configuration settings received from the plurality of systems. The method also includes providing the best-performing configuration setting to the plurality of systems.

DETAILED DESCRIPTION OF THE EMBODIMENTS

Glossary

Figure 1:
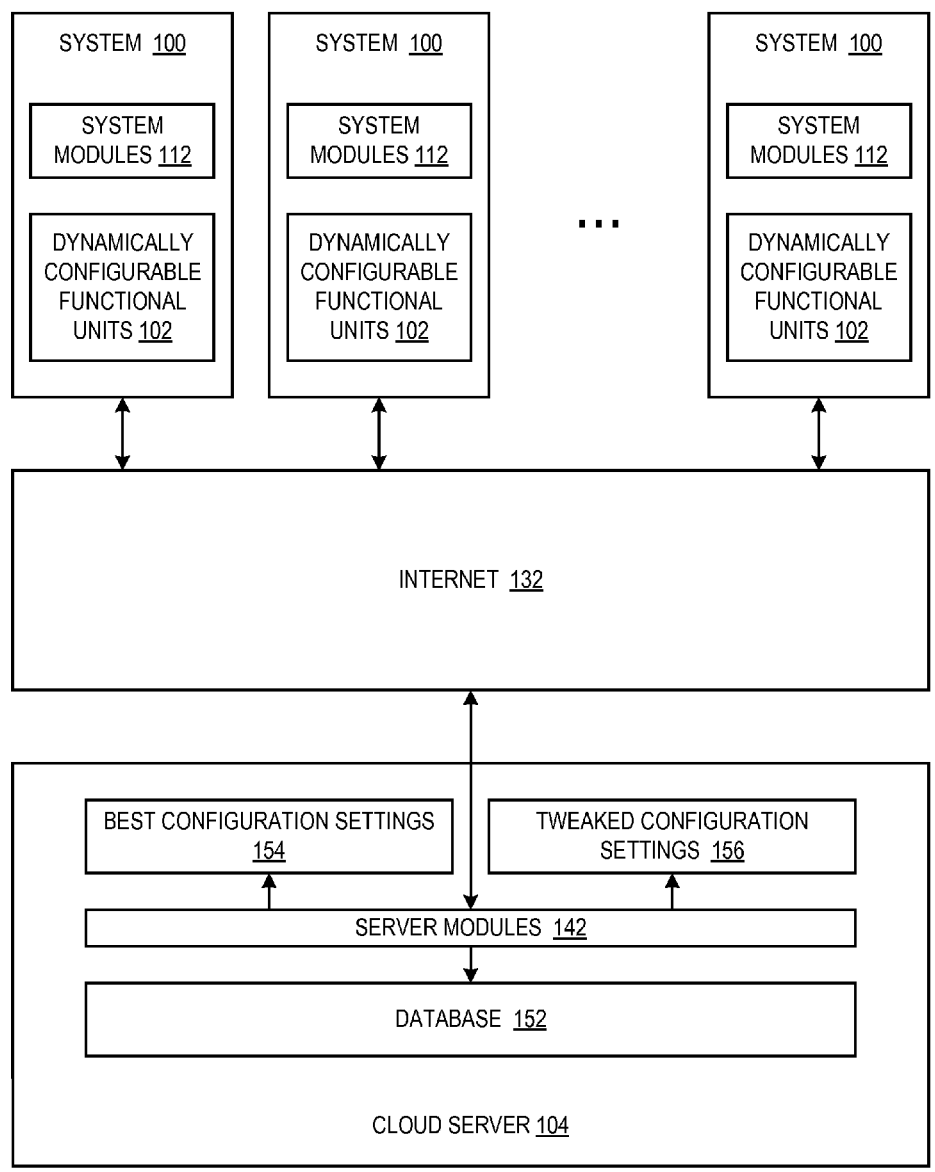
FIG. 1 is a block diagram illustrating a network of computing systems.

A server is a computing system that is networked to a plurality of other computing systems and that receives information from the other systems, analyzes the information, and sends results of the analysis to the other systems.

A module is hardware, software or a combination of hardware and software.

A system is a computing device that is capable of fetching and executing stored program instructions to process data. A system includes functional units that perform the stored program instructions to process the data.

A functional unit is hardware or a combination of hardware and software within a system that performs a function associated with the processing of an instruction. Examples of functional units include, but are not limited to: a memory controller; a system agent; and units included in a central processing unit (CPU) or graphic processing unit (GPU), such as an instruction fetch unit, a branch prediction unit, an instruction format unit, an instruction translation unit, a register renaming unit, an instruction scheduling unit, an execution unit (such as an integer unit, a floating point unit, a branch unit, a single issue multiple data (SIMD) unit, a multimedia unit, a load unit, a store unit), a reorder buffer, a retire unit, a cache memory, a data prefetch unit, a power management unit, a memory management unit, a store-collision detection unit.

A functional unit is dynamically reconfigurable if its configuration setting may be changed while the system is operating. It should be understood that in order to change the configuration setting of a dynamically reconfigurable functional unit, the system might first pause processing of instructions by the dynamically reconfigurable functional unit and/or the entire system while the configuration setting change is being made. For example, in one embodiment microcode changes the configuration setting by writing a value to configuration registers. The microcode routine may serialize execution of instructions before the new configuration settings are written and until the new configuration settings take effect.

A configuration setting of a functional unit is state that causes the functional unit to perform its function in different manners when the state has different values. The different manners affect the performance, power consumption and/or correctness with which the functional unit performs its functions.

Performance data is data that provides a measure of how fast a system is executing a program, how much power the system is using to execute the program, or a combination thereof.

To improve the performance of a computing system that includes dynamically reconfigurable functional units, a giant laboratory of performance experimentation is effected that includes many instances of the system whose users opt-in to the experiment in order to enable an experimenter (e.g., the manufacturer of the system) to determine improved configuration settings of the dynamically reconfigurable functional units for specific programs or for programs that exhibit similar characteristics. The many instances of the system continuously collect performance data while they run a program while the dynamically configurable functional units are configured with a particular configuration setting. The systems periodically send information (the performance data, configuration setting and information used to identify the program) to a server via the Internet. The server aggregates the information from all the systems, analyzes it, and determines a best configuration setting for the program. The server then slightly tweaks the best configuration setting. The systems receive (e.g., upon request) the tweaked configuration setting and dynamically reconfigure themselves with the tweaked configuration setting. The systems then repeat the process of collecting the performance data with the tweaked settings and sending the information to the server, which re-analyzes the aggregated information and sends a new tweaked configuration setting. The systems and server iterate on this process to continuously improve the configuration setting for the program. Preferably, the iterative process ends when the server analysis indicates the rate of improvement has leveled off and/or the universe of possible configuration settings has been exhausted.

The server may perform this process for many different programs and keep a database of best configurations to provide to systems upon request. The configurability level may be narrowly at a processor or more broadly at a processor in combination with other elements, for example, to form a system on chip (SOC). The performance may be measured either in terms of speed, power consumption or a combination thereof. Systems that do not opt-in to participate by running the tweaked configurations may still request and receive the best configurations from the server and experience a performance benefit therefrom, as may systems that do not even opt-in to share their information. It should be understood that the iterations are not performed in lock step by all the systems that opt-in to the experiment, but rather the server iterates with the systems individually based on the particular programs a system instance is running. However, each system may benefit from earlier iterations by other systems regarding a given program.

Referring now to FIG. 1, a block diagram illustrating a network 199 of computing systems. The network 199 includes a cloud server 104 and a plurality of systems 100 in communication with the cloud server 104 via the Internet 132. Each of the systems 100 includes dynamically configurable functional units 102 and system modules 112. The cloud server 104 includes a database 152 and server modules 142 that analyze the information in the database 152 to generate best configuration settings 154 and tweaked configuration settings 156, which are described in more detail below. Each of the systems 100 is a computing system, which may include but is not limited to: a server computer, a desktop computer, a laptop computer, a notebook computer, a personal digital assistant, a tablet computer, a smart phone, a television, a router, a modem, a set-top box, and an appliance. Embodiments of the systems 100 are described herein and particularly with respect to FIG. 11. The system modules 112 perform many of the various functions, or operations, performed by the system 100 that are described herein. The system modules 112 may include hardware, software or a combination of hardware and software. Preferably, the system 100 includes hardware and/or microcode that monitor the system 100 to collect the performance data collected (e.g., at block 302 of FIG. 3). In one embodiment, the system 100 includes one or more small service processors that monitor architectural processing elements (e.g., processing cores) of the system 100, cache memories, a memory controller, graphics processing units (GPUs) and/or system agent of a system on chip (SOC), to collect the performance data and program characteristics.

Figure 2:
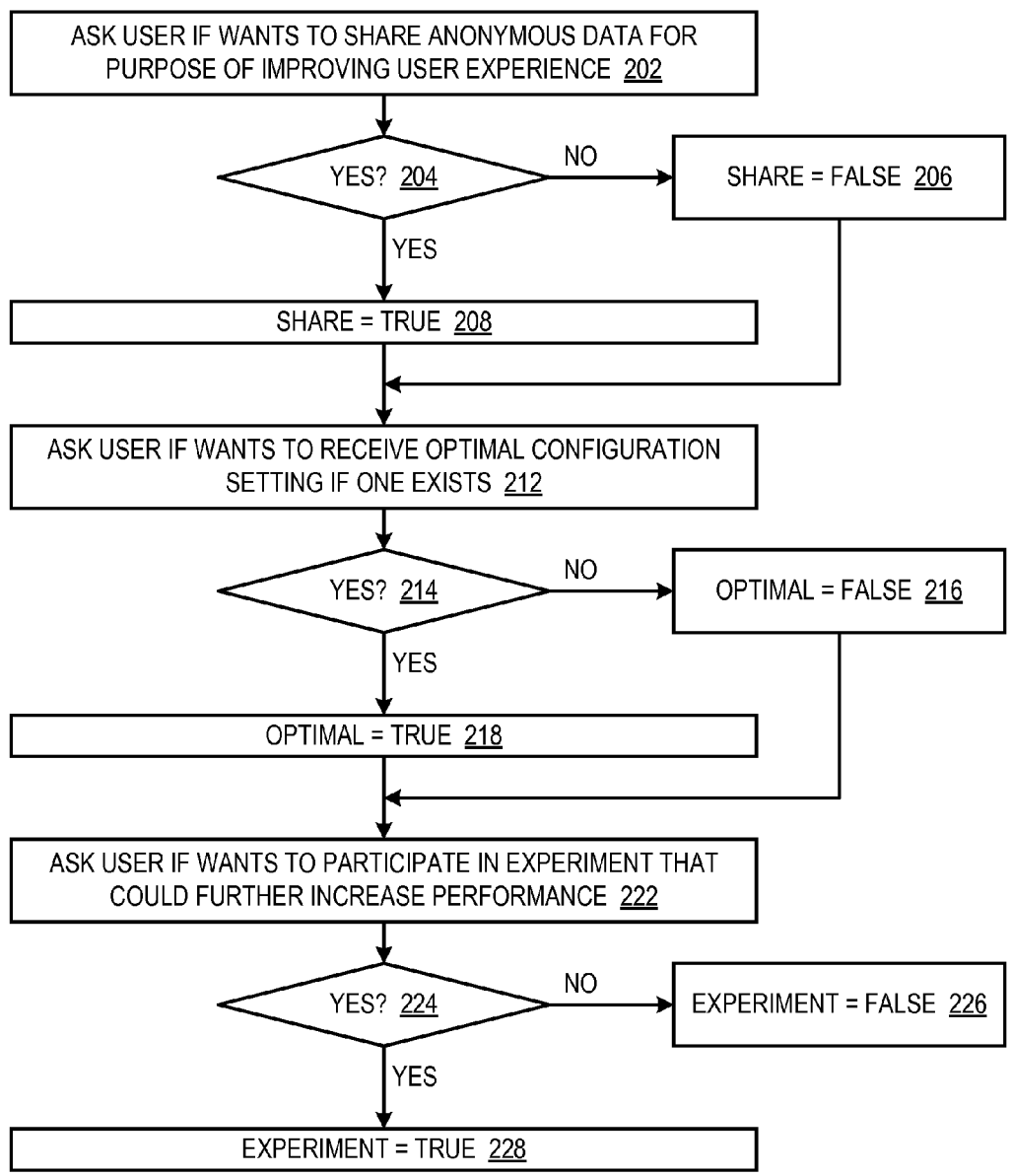
FIG. 2 is a flowchart illustrating operation of the systems of FIG. 1.

Referring now to FIG. 2, a flowchart illustrating operation of the systems 100 of FIG. 1 is shown. Flow begins at block 202.

At block 202, the system 100 (e.g., a system module 112) asks a user of the system 100 if the user wants to share anonymous information with the manufacturer of the system 100 for the purpose of improving user experience. Flow proceeds to decision block 204.

At decision block 204, if the user agrees to share the information, flow proceeds to block 208; otherwise, flow proceeds to block 206.

At block 206, the system 100 assigns a false value to a "share" indicator. Flow proceeds to block 212.

At block 208, the system 100 assigns a true value to the "share" indicator. Flow proceeds to block 212.

At block 212, the system 100 asks the user if the user wants to receive optimal configuration settings from the manufacturer of the system 100 if they are available. Flow proceeds to decision block 214.

At decision block 214, if the user wants optimal configuration settings, flow proceeds to block 218; otherwise, flow proceeds to block 216.

At block 216, the system 100 assigns a false value to an "optimal" indicator. Flow proceeds to block 222.

At block 218, the system 100 assigns a true value to the "optimal" indicator. Flow proceeds to block 222.

At block 222, the system 100 asks the user if the user wants to participate in experimentation that could further increase the performance of his system 100 and the systems 100 of others by receiving experimental configuration settings from the manufacturer of the system 100 if they are available. Flow proceeds to decision block 224.

At decision block 224, if the user wants to participate in experimentation, flow proceeds to block 228; otherwise, flow proceeds to block 226.

At block 226, the system 100 assigns a false value to an "experiment" indicator. Flow ends at block 228.

At block 228, the system 100 assigns a true value to the "experiment" indicator. Flow ends at block 228.

Figure 3:
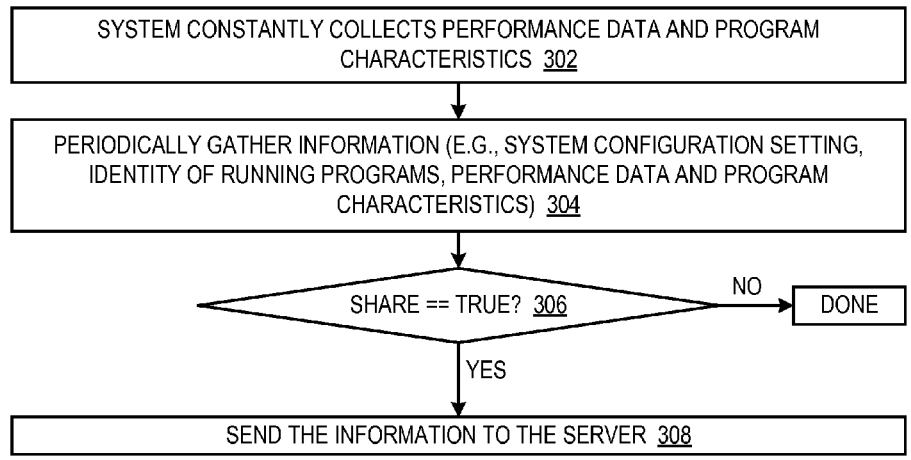
FIG. 3 is a flowchart illustrating operation of the systems of FIG. 1.

Referring now to FIG. 3, a flowchart illustrating operation of the systems 100 of FIG. 1 is shown. Flow begins at block 302.

At block 302, the system 100 constantly collects performance data and characteristics of the currently running program while the dynamically configurable functional units 102 are configured with the current configuration settings. The performance data may include speed-related data, i.e., conventional meanings of performance, e.g., instructions per clock (IPC), bus utilization and the like. The collected performance data may also include a measure of the power consumed (e.g., Watts or Joules) while the system 100 was executing the program with the configuration setting so that the server 104 can makes its analysis for power and for speed (e.g., IPC per milliwatt-seconds). Furthermore, the best configuration settings 154 and tweaked configuration settings 156 may be best/tweaked with respect to power consumption (e.g., battery life) rather than speed, or a combination of the two. Finally, the server may provide speed-optimized, power-optimized and hybrid-optimized best/tweaked configurations 154/156, and the system modules 112 select one with which to reconfigure the system 100 based on the current system environment (e.g., plugged in or running on battery) and/or indicated user preference (speed preferred over power consumption or vice versa). Alternatively, the system 100 knows the current system environment and/or indicated user preference and only asks the server 104 for the configuration it wants. The program characteristics may include, but are not limited to, patterns of memory accesses made by the program, quantities of different types of instructions used by the program, and information related to the effectiveness of particular functional units of the system 100 (e.g., data prefetchers or branch predictors) during execution of the program while configured with the current configuration settings. Flow proceeds to decision block 304.

At block 304, the system 100 (e.g., a system module 112) periodically gathers information to send to the server 104. The system 100 may gather the information in response to the termination of the currently running program (e.g., a new program gets swapped in to run) for which the performance data is being gathered at block 302, in response to a timer tick (e.g., operating system timer tick) or a change in the system 100 configuration settings, for examples. In one embodiment, the system 100 is capable of automatically reconfiguring itself. For example, the system 100 may detect that one of its data prefetch units is predicting poorly and turns off the data prefetch unit or that the system 100 is consuming too much power and reconfigures one or more of the functional units 102 to reduce power consumption. In such an embodiment, the system modules 112 may be notified (e.g., via an interrupt) of the configuration change, in response to which the system modules 112 may gather the information to send to the server 104. In this manner, the server 104 may benefit from aggregating information about program performance for configuration settings that may not have even been tried by the server 104, i.e., configuration settings that are dynamically created by the systems 100 themselves as they operate in response to observations made the by system 100 as a program runs. The information gathered includes, but is not limited to, the system configuration settings, the identity of the running program, and the performance data and/or program characteristics collected at block 302. Preferably, one or more of the system modules 112 gather the information. In one embodiment, a device driver running on the system 100 gathers the information. Flow proceeds to decision block 306.

At decision block 306, if the user has chosen not to share the information (e.g., per block 206), flow ends; otherwise, flow proceeds to block 308. In one embodiment, if the user has chosen not to share the information, the system 100 may configure itself not to collect the performance data and program characteristics at block 302 and the system modules 112 may not gather the information at block 304.

At block 308, the system 100 sends the information gathered at block 304 to the server 104 via the Internet 132. Preferably all communications between the system 100 and the server 104 that include system configuration information are encrypted to keep secret any information about the microarchitecture of the system 100. In one embodiment, the system 100 uses http queries to request and receive configurations from the server 104. The information sent to the server 104 is anonymous, i.e., it includes no details about the user. Preferably the program name is obfuscated, e.g., as a hashed value of the original string, in order to maintain anonymity. Flow ends at block 308.

Figure 4:
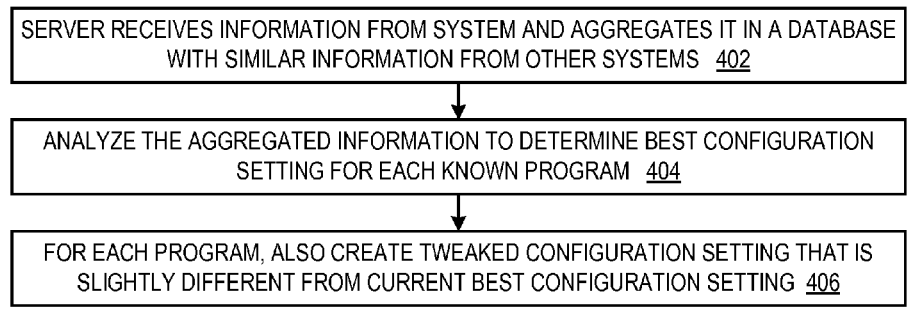
FIG. 4 is a flowchart illustrating operation of the server of FIG. 1.

Referring now to FIG. 4, a flowchart illustrating operation of the server 104 of FIG. 1 is shown. Flow begins at block 402.

At block 402, the server 104 (e.g., a server module 142) receives the information sent by the systems 100 at block 308 of FIG. 3. The server 104 continually aggregates the received information into the database 152 of FIG. 1. Preferably, the server 104 also continues to receive and aggregate the information from systems 100 that are running the best configuration setting 154, i.e., because at block 226 they did not opt-in to receiving tweaked configuration settings 156. Preferably, the information is arranged according to program name and/or program characteristic group, i.e., the configuration settings and performance data is kept per program and/or program characteristic grouping. Preferably, the manufacturer initially seeds the database 142 with default configuration settings with which the systems 100 are shipped to the users and other configuration settings the manufacturer determines by conventional methods for programs/groups of particular interest. Flow proceeds to block 404.

At block 404, the server 104 analyzes the aggregated information in the database 152 to determine the best configuration setting 154 for each known program and/or program characteristic group. The best configuration setting 154 for a program/group is the configuration setting having the best performance. Given the large data set aggregated by the server 104 for each program, there will likely be some disagreement regarding the configuration setting yielding the best performance. For example, 20,000 systems may report that configuration setting A performs best, however, 15,000 systems may report that configuration setting A performs worse than a configuration B. In such case, the analysis by the server 104 may involve additional data analysis. For example, the server 104 may generate an average of the performance data reported for each configuration setting and select the configuration setting associated with the best average performance data. For another example, the server 104 may exclude data points at the extremities or exclude information associated with particular systems 100 determined by the server 104 to report unreliable information. Preferably, the server 104 generates a best configuration setting with respect to speed (i.e., fastest), a best configuration setting with respect to power consumption (i.e., least power consumed), and a best configuration setting with respect to speed and power (e.g., highest IPC-per-milliwatt), all of which are available to the systems 100. Flow proceeds to block 406.

At block 406, the server 104 also creates a tweaked configuration setting 156 for each program or program group. The tweaked configuration setting is a slightly modified version of the best configuration setting determined at block 404. Preferably, the server 104 will change one setting with respect to one dynamically configurable functional unit 102 relative to the best configuration setting 154. For example, the best configuration setting 154 may have a parameter that affects data prefetch aggressiveness in a data prefetcher (e.g., data prefetcher 1116 of FIG. 11) set to a particular value, whereas the tweaked configuration setting 156 may have the parameter value incremented by one relative to the best configuration setting 154. For another example, the best configuration setting 154 may have a parameter that apportions bandwidth (e.g., between a GPU, e.g., GPU 1108 of FIG. 11, and multiple processing cores, e.g., cores 1102 of FIG. 11) in a memory controller (e.g., memory controller 1114 of FIG. 11) or in a system agent (e.g., system agent 1104 of FIG. 11) set to a particular value, whereas the tweaked configuration setting 156 may have the parameter value decremented by one relative to the best configuration setting 154. In this manner (e.g., by generating tweaked configuration settings 156 (block 406) and sending them to the systems 100 (block 504 of FIG. 5), receiving and aggregating the gathered information from the systems 100 with respect to the tweaked configuration settings 156 (block 402), analyzing the aggregated information to determine the best configuration setting 154 (block 404), tweaking the best configuration setting 154 (block 406), and iterating on these steps), the server 104 constantly experiments in small, subtle ways to try and improve the user experience and the database 142 of best configurations 154 available to the systems 100. Indeed, in this fashion, very high performance configuration settings for a program may be determined that may be counter-intuitive to the system designers and therefore might not have otherwise been attempted by them, but which is determined by the nature of the experimentation process described herein. At least in part, this may be due to the fact that the iterative and large-scale manner potentially allows the testing of many orders of magnitude more configuration settings to be performance tested than by conventional methods. Preferably, the server 104 excludes from consideration as a tweaked configuration setting 156 any configuration setting that is known by the manufacturer from prior testing to perform poorly and/or to function incorrectly. Flow ends at block 406.

Figure 5:
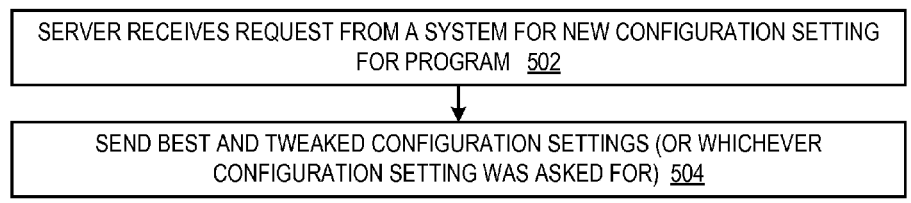
FIG. 5 is a flowchart illustrating operation of the server of FIG. 1.

Referring now to FIG. 5, a flowchart illustrating operation of the server 104 of FIG. 1 is shown. Flow begins at block 502.

Figure 6:
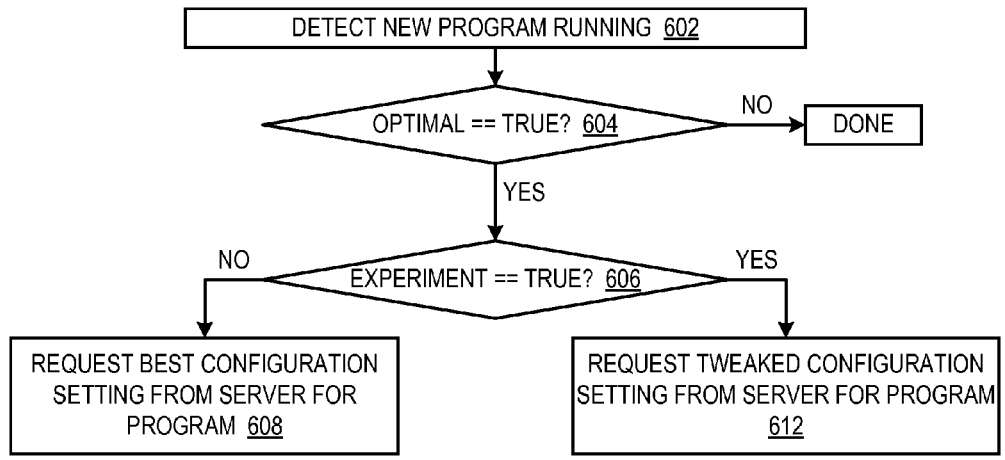
FIG. 6 is a flowchart illustrating operation of a system of FIG. 1.
Figure 8:
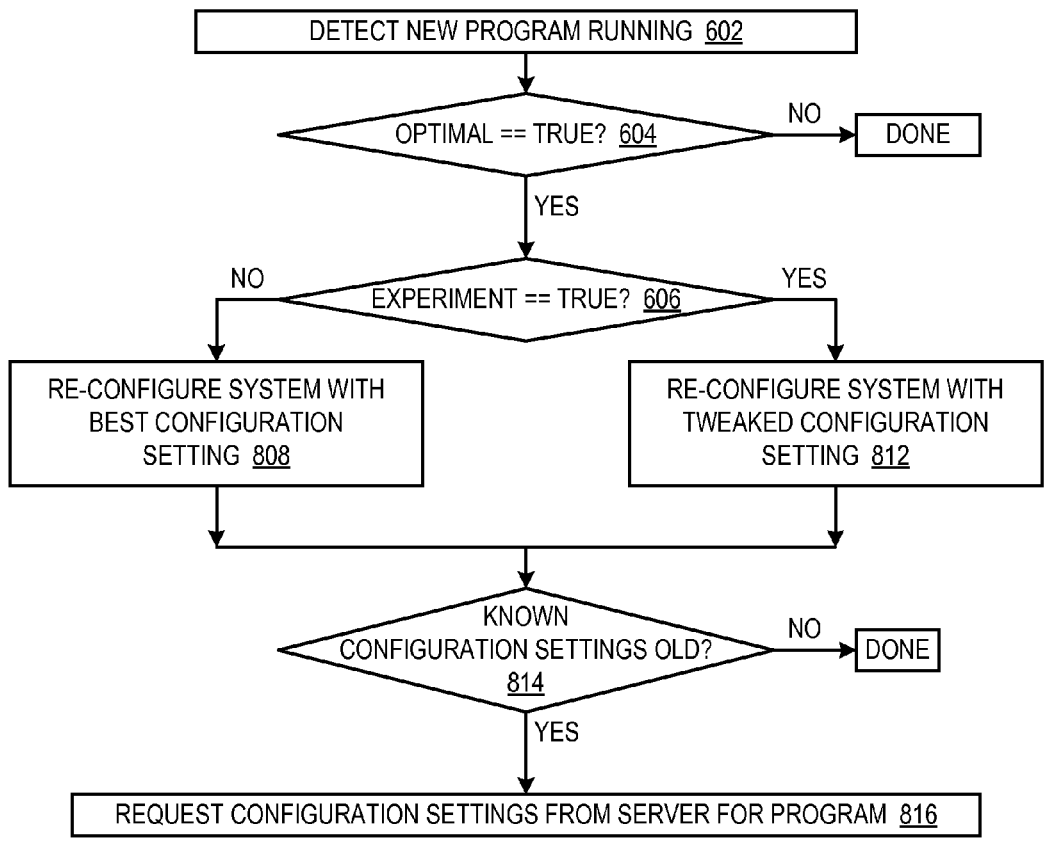
FIG. 8 is a flowchart illustrating operation of a system of FIG. 1 according to an alternate embodiment.

At block 502, the server 104 receives a request from one of the systems 100 for a new configuration setting for a program (e.g., because a system 100 sent a request at block 616 of FIG. 6 or block 818 of FIG. 8). In one embodiment, the request includes the name of the program for which a new configuration setting is being requested. In one embodiment, the request includes program characteristics (such as gathered at block 304 of FIG. 3) to identify the program for which a new configuration setting is being requested. Flow proceeds to block 504.

At block 504, the server 104 sends both the best configuration setting 154 and the tweaked configuration setting 156 to the system 100 that requested it at block 502. Alternatively, if the system 100 requested only the best configuration setting 154 or the tweaked configuration setting 156, then the server 104 sends the requested configuration setting 154/156. As discussed above, the best/tweaked configuration setting 154/156 may include multiple configuration settings, e.g., one optimized for speed, one for power consumption and one for both. Flow ends at block 504.

Referring now to FIG. 6, a flowchart illustrating operation of a system 100 of FIG. 1 is shown. Flow begins at block 602.

At block 602, the system 100 (e.g., a system module 112) detects that a new program is running and therefore it may be advantageous to dynamically reconfigure the dynamically configurable functional units 102 of the system 100. Flow proceeds to decision block 604.

At decision block 604, the system 100 determines whether the optimal indicator is true (per block 218) or false (per block 216). If false, flow ends; otherwise, flow proceeds to decision block 606.

At decision block 606, the system 100 determines whether the experiment indicator is true (per block 228) or false (per block 226). If false, flow proceeds to block 608; otherwise, flow proceeds to decision block 612.

At block 608, the system 100 requests the best configuration setting 154 from the server 104 for the new running program, which request is received at block 502 of FIG. 5. Preferably, a system 100 may request configuration settings from the server 104 even though at block 206 the user did not opt-in to share its information. Flow ends at block 608.

At block 612, the system 100 requests the tweaked configuration setting 156 from the server 104 for the new running program, which request is received at block 502 of FIG. 5. Flow ends at block 612.

Figure 7:
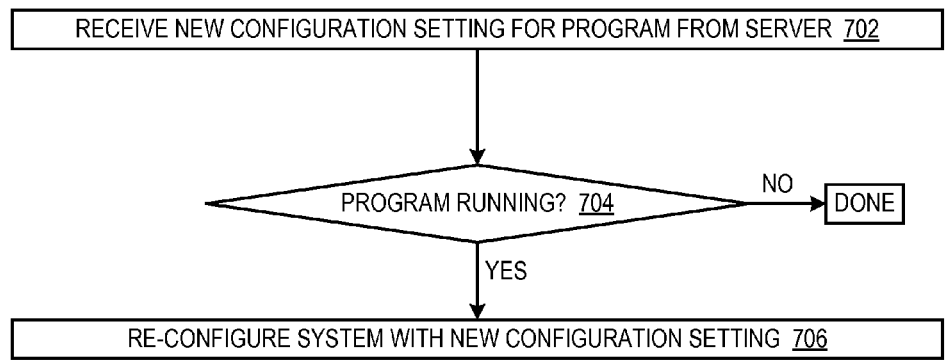
FIG. 7 is a flowchart illustrating operation of a system of FIG. 1.

Referring now to FIG. 7, a flowchart illustrating operation of a system 100 of FIG. 1 is shown. Flow begins at block 702.

At block 702, the system 100 receives a new configuration setting for a program from the server 104, namely the configuration setting requested at block 608 or block 612 of FIG. 6 and provided by the server at block 504 of FIG. 5. Flow proceeds to decision block 704.

At decision block 704, the system 100 determines whether the program (or program characteristic group) for which the new configuration setting was received at block 702 is the currently running program (or program characteristic group). If not, flow ends; otherwise, flow proceeds to block 706. Preferably, the system module 112 queries the operating system to determine whether the program for which the server 104 provided the new configuration. Alternatively, the system module 112 examines the run queue of the operating system to determine whether the program is likely to run in the near future. In the case of a program characteristic group, the system 100 compares the program characteristic group received from the server 104 at block 702 with the characteristics of the currently running program being gathered at block 302 of FIG. 3.

At block 706, the system 100 reconfigures the dynamically configurable functional units 102 with the new configuration setting received at block 702. Flow ends at block 706.

Referring now to FIG. 8, a flowchart illustrating operation of a system 100 of FIG. 1 according to an alternate embodiment is shown. In the alternate embodiment of FIG. 8, the system 100 maintains a list of known programs (or program characteristic groups) and associated best and tweaked configuration settings received previously from the server 104 and draws from the known list as needed. The system 100 updates the list at block 903 of FIG. 9 as described below. The embodiment of FIGS. 8 and 9 potentially enables the system 100 to be more responsive to changes in the running program than the embodiment of FIGS. 6 and 7; however, the embodiment of FIGS. 6 and 7 potentially enables the system 100 to reconfigure the dynamically configurable functional units 102 with more update-to-date configuration settings. The flowchart of FIG. 8 is similar in many respects to the flowchart of FIG. 6 and like-numbered blocks are similar. However, in FIG. 8, blocks 608 and 612 of FIG. 6 are not included; if the experiment indicator is false flow proceeds to block 808; and if the experiment indicator is true flow proceeds to block 812.

At block 808, the system 100 reconfigures the dynamically configurable functional units 102 with the best configuration setting for the program (identified per block 602) from the list of known configuration settings. Flow proceeds from block 808 to decision block 814.

At block 812, the system 100 reconfigures the dynamically configurable functional units 102 with the tweaked configuration setting for the program (identified per block 602) from the list of known configuration settings. Flow proceeds from block 812 to decision block 814.

At decision block 814, the system 100 determines whether the list of known configuration settings for the new running program is old. If so, flow proceeds to block 816; otherwise, flow ends. Preferably, for each configuration setting in the list, the system 100 maintains a timestamp that indicates the time at which the system 100 received the configuration setting from the server 104. Once the age of a configuration setting, determined per the timestamp, exceeds a predetermined threshold, the system 100 determines the configuration setting is old. In one embodiment, the predetermined threshold is programmable and may be tuned based on the characteristics of the workload on the system 100 and/or the iteration period of the server 104.

At block 816, the system 100 requests new configuration settings from the server 104 for the new running program, which request is received at block 502 of FIG. 5. Flow ends at block 816.

Figure 9:
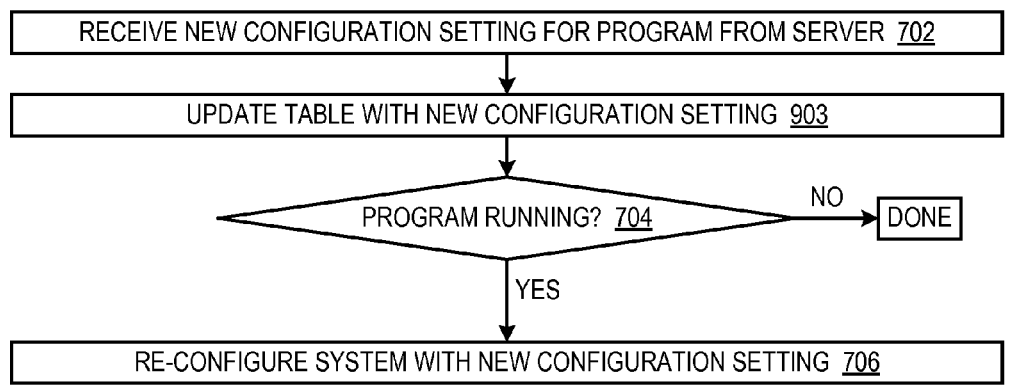
FIG. 9 is a flowchart illustrating operation of a system of FIG. 1 according to an alternate embodiment.

Referring now to FIG. 9, a flowchart illustrating operation of a system 100 of FIG. 1 according to an alternate embodiment is shown. The flowchart of FIG. 9 is similar in many respects to the flowchart of FIG. 7 and like-numbered blocks are similar. However, in FIG. 9, a new block 903 is included. Flow begins at block 702 and proceeds from block 702 to block 903 and from block 903 to decision block 704.

At block 903, the system 100 updates the list of known configuration settings with those received at block 702. Flow proceeds from block 903 to decision block 704 and proceeds as described with respect to FIG. 7.

Figure 10:
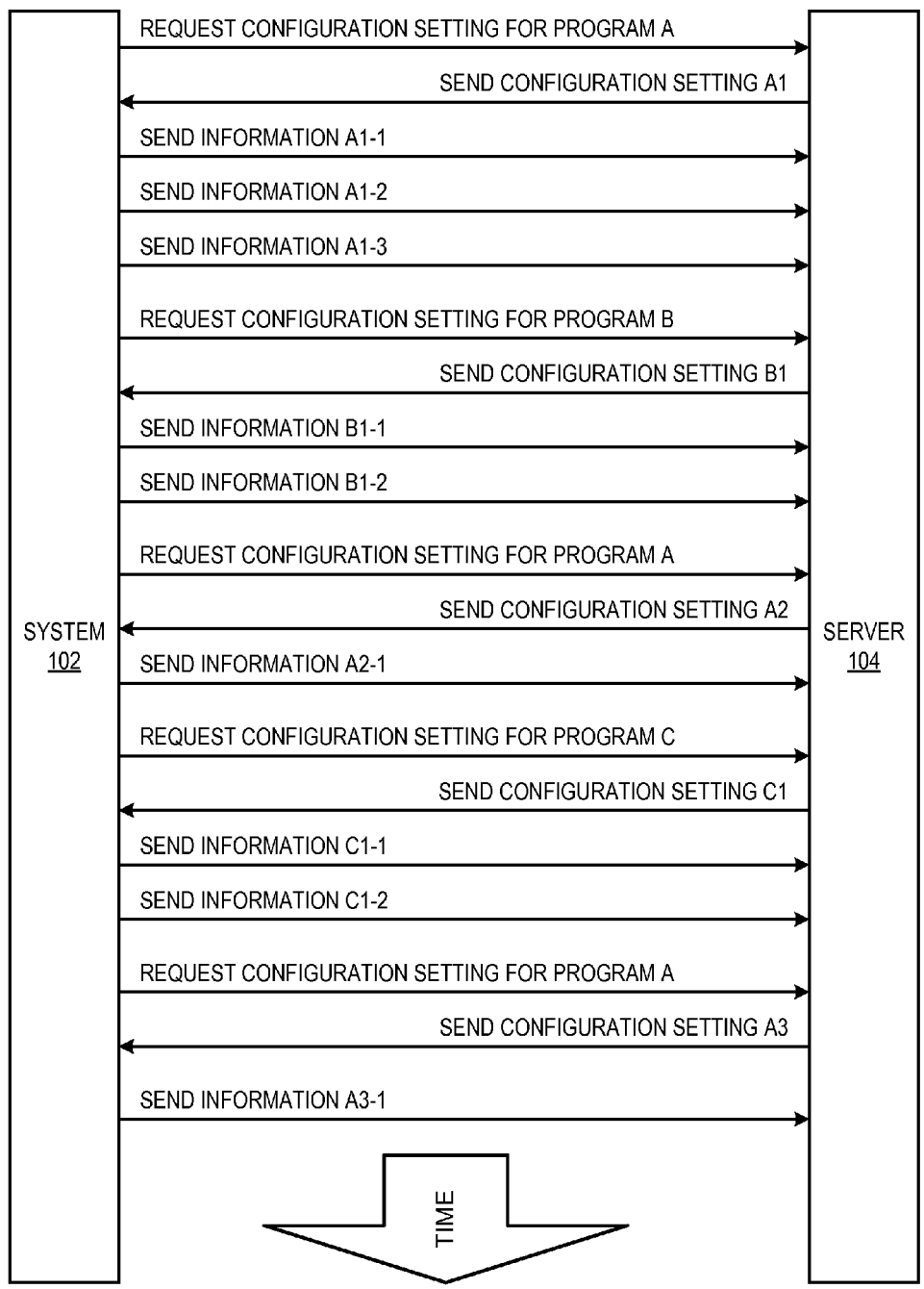
FIG. 10 is a timing diagram illustrating an example of operation of the network of FIG. 1.

Referring now to FIG. 10, a timing diagram illustrating an example of operation of the network 199 of FIG. 1 is shown. The timing diagram shows the server 104 and one of the systems 100 of FIG. 1 exchanging messages with one another according to the mechanism described herein for conducting experimentation using a large number of instances of the systems 100 in order to determine high performing configuration settings of dynamically configurable functional units 102 of the systems 100. In the diagram, time proceeds downward. The example of FIG. 10 assumes the system 100 has opted-in to sharing its information per block 208, to receiving optimal configuration settings per block 218, and to participating in experimentation per block 228.

Per block 602 the system 100 detects a new program is running (denoted program A) and per block 612 or 816 the system 100 sends the server 104 a request for a configuration setting for program A. The server 104 receives the request per block 502 and per block 504 sends a configuration setting (denoted configuration setting A1) to the system 100. Per block 702 the system 100 receives configuration setting A1 and per block 706 reconfigures the dynamically configurable functional units 102 with configuration setting A1 and per block 308 periodically sends to the server 104 the information gathered at block 304 while running program A with configuration A1 (denoted information A1-1, A1-2 and A1-3).

Per block 602 the system 100 detects a new program is running (denoted program B) and per block 612 or 816 the system 100 sends the server 104 a request for a configuration setting for program B. The server 104 receives the request per block 502 and per block 504 sends a configuration setting (denoted configuration setting B1) to the system 100. Per block 702 the system 100 receives configuration setting B1 and per block 706 reconfigures the dynamically configurable functional units 102 with configuration setting B1 and per block 308 periodically sends to the server 104 the information gathered at block 304 while running program B with configuration B1 (denoted information B1-1 and B1-2).

Per block 602 the system 100 detects program A is running again and per block 612 or 816 the system 100 sends the server 104 a request for a configuration setting for program A. The server 104 receives the request per block 502 and per block 504 sends a configuration setting (denoted configuration setting A2) to the system 100. Advantageously, configuration setting A2 will be different from configuration setting A1 since per block 402 the server 104 will have received information A1-1, A1-2 and A1-3 (and typically information from other systems 100 running program A with configuration A1 and other configurations for program A) and per block 404 aggregated and analyzed the information related to program A to generate a best configuration setting 154 and per block 406 a tweaked configuration setting 156, i.e., configuration setting A2, that is slightly different from configuration setting A1. Per block 702 the system 100 receives configuration setting A2 and per block 706 reconfigures the dynamically configurable functional units 102 with configuration setting A2 and per block 308 periodically sends to the server 104 the information gathered at block 304 while running program A with configuration A2 (denoted information A2-1).

Per block 602 the system 100 detects a new program is running (denoted program C) and per block 612 or 816 the system 100 sends the server 104 a request for a configuration setting for program C. The server 104 receives the request per block 502 and per block 504 sends a configuration setting (denoted configuration setting C1) to the system 100. Per block 702 the system 100 receives configuration setting C1 and per block 706 reconfigures the dynamically configurable functional units 102 with configuration setting C1 and per block 308 periodically sends to the server 104 the information gathered at block 304 while running program C with configuration C1 (denoted information C1-1 and C1-2).

Per block 602 the system 100 detects program A is running again and per block 612 or 816 the system 100 sends the server 104 a request for a configuration setting for program A. The server 104 receives the request per block 502 and per block 504 sends a configuration setting (denoted configuration setting A3) to the system 100. Advantageously, configuration setting A3 will be different from configuration settings A1 and A2 since per block 402 the server 104 will have received information A1-1, A1-2, A1-3 and A2-1 (and typically information from other systems 100 running program A with configurations A1, A2 and other configurations for program A) and per block 404 aggregated and analyzed the information related to program A to generate a best configuration setting 154 and per block 406 a tweaked configuration setting 156, i.e., configuration setting A3, that is slightly different from configuration settings A2 and A1. Per block 702 the system 100 receives configuration setting A3 and per block 706 reconfigures the dynamically configurable functional units 102 with configuration setting A3 and per block 308 periodically sends to the server 104 the information gathered at block 304 while running program A with configuration A3 (denoted information A3-1).

The server 104 and system 100 iterate through this process to continually generate configuration settings for program A, for example, that improve the performance of the system 100 when running program A. It should be understood that each successive configuration setting the server 104 sends out to a given system 100 may not have improved performance over its predecessor or even perhaps multiple predecessors; however, over time as the server 104 is enabled to analyze the information it aggregates and to experiment with the configuration settings, the configuration settings generated by the server 104 steadily improve the performance of the system 100 when running program A.

Figure 11:
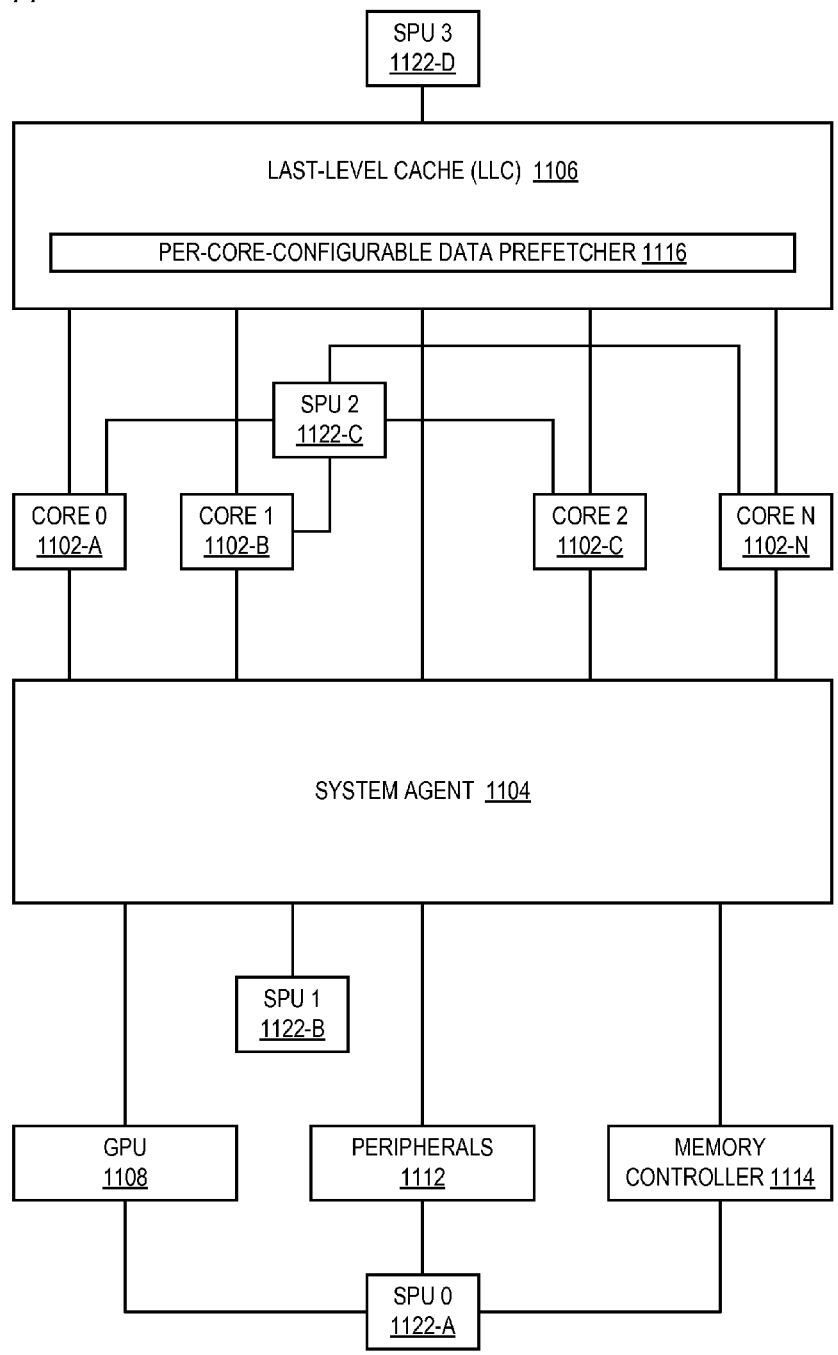
FIG. 11 is a block diagram illustrating an embodiment of a system of FIG. 1.

Referring now to FIG. 11, a block diagram illustrating an embodiment of a system 100 of FIG. 1 is shown. In one embodiment, the system 100 is a system-on-chip (SOC). The system 100 includes a plurality of processing cores 1102; a last-level cache (LLC) memory 1106 shared by the cores 1102; a graphics processing unit (GPU) 1108; a memory controller 1114; and peripherals 1112, such as a PCI-Express™ controller, a universal serial bus (USB) controller, a peripheral interrupt controller (PIC), a direct memory access (DMA) controller, a system clock, an Ethernet controller, and a Serial AT Attachment (SATA) controller. An embodiment of the cores 1102 is described in more detail with respect to FIG. 12. Embodiments of the dynamic configurability of dynamically configurable functional units 102 of the cores 1102 are described in more detail below with respect to FIG. 12.

The system 100 also includes a system agent 1104 that interconnects the cores 1102, the LLC 1106, the GPU 1108, the peripherals 1112 and the memory controller 1114. The memory controller 1114 is dynamically configurable to perform scheduling of accesses to system memory (e.g., DRAM) according to different scheduling algorithms. In one embodiment, the system agent 1102 includes a crossbar switch that interconnects the consumers and producers of memory, I/O and interrupt requests. In one embodiment, the system agent 1104 takes in packets of data from their sources and routes them through one or more fabrics and one or more levels of arbitration to reach their destinations. The system agent 1104 assigns priorities to the different requesting entities, and the priorities may be dynamically configured so that with different configurations the bandwidth of the fabric that interconnects the requesting entities is apportioned in different proportions. For example, the server 104 may determine that for one program (e.g., a video intensive program) the system agent 1104 should assign a higher priority to the GPU 1108 relative to the cores 1102 and other system 100 elements, whereas the server 104 may determine that for another program (e.g., computationally intensive program with little video output) the system agent 1104 should assign a lower priority to the GPU 1108 relative to the cores 1102 and other system 100 elements.

The LLC 1106 includes a per-core-configurable data prefetcher 1116. That is, the data prefetcher 1116 includes a different configuration setting associated with each core 1102 that enables the data prefetcher 1116 to be configured to prefetch data differently for each core 1102. For example, the server 104 may determine that the optimal configuration setting for the data prefetcher 1116 for the program running on one core 1102 is to turn off data prefetching (e.g., a data compression program), whereas the server 104 may determine that the optimal configuration setting for the data prefetcher 1116 for the program running on another core 1102 is to aggressively prefetch data in a sequential fashion (e.g., a data program that is predominated by streaming data). In one embodiment, the GPU 1108 may share the LLC 1106 with the cores 1102, and the amount apportioned to the GPU 1108 and to the cores 1102 is dynamically configurable.

The system 100 also includes a plurality of service processors (SPUs) 1122. In the embodiment of FIG. 11, a first SPU 0 1122-A is coupled to the GPU 1108, the peripherals 1112 and memory controller 1114; a second SPU 1122-B is coupled to system agent 1104; a third SPU 2 1122-C is coupled to the cores 1102; and a fourth SPU 3 1122-D is coupled to the LLC 1106. The SPUs 1122 are processing elements capable of processing stored programs. Preferably, the SPUs 1122 are much less complex than the cores 1102 and consume orders of magnitude less die space and power than the cores 1102. The SPUs 1122 monitor the activity of the system 100 elements to which they are coupled and gather performance data and program characteristics. The cores 1102 obtain the performance data and program characteristics from the SPUs 1122. Additionally, the cores 1102 gather performance data and program characteristics. The SPUs 1122 are also dynamically configurable. In one embodiment, the code executed by the SPUs 1122 is patchable via programs running on the cores 1102. Preferably, the SPUs 1122 are capable of writing configuration registers to dynamically configure their respective system 100 elements. In one embodiment, the SPUs 1122 are in communication with one another to share gathered performance data and program characteristics.

Figure 12:
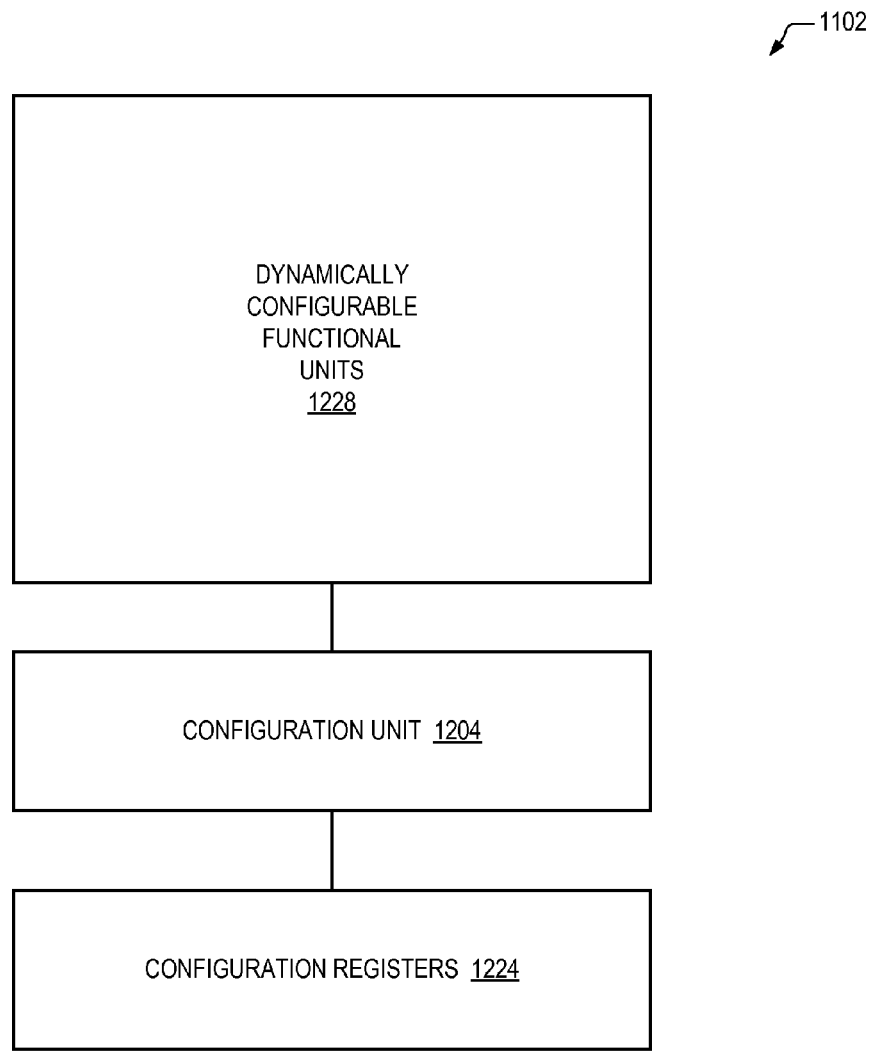
FIG. 12 is a block diagram illustrating an embodiment of one of the processing cores of FIG. 11.

Referring now to FIG. 12, a block diagram illustrating an embodiment of one of the processing cores 1102 of FIG. 11 is shown. The core 1102 includes dynamically configurable functional units 1228, configuration registers 1224, a configuration unit 1204. Although not shown, the core 1102 may also include functional units that are not dynamically reconfigurable. In one embodiment, the core 1102 includes a superscalar out-of-order execution microarchitecture, although the dynamic reconfiguration described herein may be performed on a processing core including different microarchitectures. In one embodiment, the core 1102 includes an x86 instruction set architecture, although the dynamic reconfiguration described herein may be performed on a processing core including different instruction set architectures.

The configuration registers 1224 hold a configuration setting and provide the configuration setting to the dynamically configurable functional units 1228 to control particular aspects of their operation. Examples of different operational aspects that may be dynamically reconfigured by the configuration setting include, but are not limited to, the following.

A data prefetch configuration setting configures how data is prefetched from system memory into the various cache memories of the core 1102 and/or into the last level cache memory 1106. For example, the processing core 1102 may prefetch highly likely predicted data directly into the L1 data cache of the core 1102, and/or to prefetch less likely predicted data into a dedicated prefetch buffer separate from the L1 or L2 data caches. For another example, data prefetching by the data prefetcher may be disabled for applications that consistently trigger unneeded and/or harmful prefetches, such as compression or decompression programs. For another example, the data prefetcher may be disabled from performing prefetches requested by prefetch instructions in a software application if they tend to negatively interact with prefetches initiated internally by the core 1102.

A branch prediction configuration setting configures the manner in which the core 1102 predicts branch instructions. For example, the number of branch instructions that a branch predictor of the core 1102 can predict from each line of its instruction cache may be configured. Additionally, the number of unique branch prediction mechanisms used by the branch predictors may be configured. Furthermore, the branch predictors may be configured to assume whether a reverse JZ (jump on zero) branch instruction is usually taken or not taken. Still further, a hashing algorithm used for indexing into a branch target address cache (BTAC) within the branch predictors may be configured. Finally, the branch predictors may be configured to temporarily disable branch prediction altogether, or to temporarily disable portions of the branch prediction mechanism, such as a BTAC within the branch predictors, if one or more of the currently running software applications in the predetermined list tend to execute highly unpredictable branch instructions.

An instruction cache eviction configuration setting configures the algorithm the core 1102 uses to evict instructions from the instruction cache.

A suspend execution configuration setting configures whether the core 1102 temporarily suspends executing program instructions. For example, the core 1102 may be configured to temporarily suspend executing instructions in response to determining that the idle process of the operating system has been executing for a predetermined amount of time.

An L1 instruction cache memory size configuration setting, an L1 data cache memory size configuration setting, and an L2 cache memory size configuration setting configure the size of the L1 instruction cache, L1 data cache, or L2 cache memory, respectively. For example, the cache memory sizes may be configured based on the size of the working data set of one or more of the currently running software applications. Alternatively, the size of the cache memories may be configured based on power savings requirements.

A translate/format configuration setting configures how the instruction translator/formatter translates and/or formats instructions. For example, the number of instructions the instruction translator/formatter translates and/or formats each clock cycle may be configured. For example, the instruction translator/formatter may be configured to translate and/or format only a single instruction per clock cycle in order to lower the power consumption of the core 1102 when this will suffice based on the running applications. Additionally, the translator/formatter may be disabled from merging instructions in order to reduce power consumption.

A speculative tablewalk configuration setting configures whether a memory management unit (MMU) of the core 1102 performs speculative page tablewalks in response to a translation lookaside buffer (TLB) miss. For example, the MMU may be configured to disable speculative tablewalks for an application that causes the speculations to be consistently incorrect, thereby evicting otherwise useful entries in the TLB. In one embodiment, the magnitude of the speculation of the tablewalk may be configured. For example, the MMU may be configured to only perform a speculative page tablewalk after all older store operations have been retired, or after all older store operations have their addresses resolved, or without regard for older store operations. Additionally, the MMU may be configured to control both data and code speculative tablewalks independently. Furthermore, the MMU may be configured to perform the tablewalk speculatively but not update the TLB speculatively. Finally, the MMU may be configured to distinguish what types of micro-ops or hardware functions can speculatively tablewalk such as various software or hardware prefetches.

An L1 cache miss behavior configuration setting configures whether the MMU, in response to a miss in the L1 instruction cache, requests data from the L2 cache and the processor bus in a serial or parallel fashion.

A forwarding hash configuration setting configures the algorithm used by the core 1102 to hash virtual address bits in address comparisons to detect whether the core 1102 should perform a data forwarding operation, such as to a load instruction from an older, unretired store instruction, or between a load queue and a fill queue. For example, the following may be configured: the number of bits in addition to the page index bits of the virtual address that will be compared, which of the non-page index bits will be hashed to generate those bits, and how the chosen bits will be hashed.

A queue size configuration setting configures the usable size of various queues within the core 1102, such as store queues, load queues, and cache line fill queues. For example, the various queues may be configured to smaller sizes in order to reduce the amount of power consumption when smaller queues will suffice based on the running applications.

An issue size configuration setting configures the number of instructions that the core 1102 will issue to the various execution units in a single clock cycle. For example, this may be configured to a relatively smaller value in order to reduce the amount of power consumption when a smaller number of instructions issued per clock cycle will suffice based on the running applications.

A reorder buffer (ROB) size configuration setting configures the number of usable entries in the ROB. For example, the number of ROB entries may be configured to a relatively small number in order to reduce the amount of power consumption when a smaller number of ROB entries will suffice based on the running applications.

An out-of-orderness configuration setting configures aspects of how the core 1102 employs out-of-order execution of instructions. For example, the core 1102 may be configured to execute instructions in strict program order (i.e., no out-of-order execution). Additionally, the core 1102 may be configured regarding how deep within the instruction window the instruction dispatcher may look for independent instructions to issue for execution to the execution units.

A load delay configuration setting configures whether a load delay mechanism of the core 1102 is disabled or enabled. In one embodiment, the core 1102 speculatively issues a load instruction and may have to replay the load instruction if it depends upon an older store instruction from which the data is not yet available, which may be deleterious to performance. To reduce the likelihood of the replay, the load delay mechanism selectively delays the issue of a load instruction based on past history of the load instruction having been replayed. However, some software applications may exhibit a tendency to perform worse when the load delay mechanism is enabled. Thus, for example, the load delay mechanism may be disabled for a software application that exhibits this tendency.

A non-temporal load/store configuration setting configures the core 1102 behavior for load/store instructions that include a non-temporal data hint to prevent the core 1102 from caching their data. Some software applications may have been written to employ the non-temporal load/store instructions with the assumption that the data caches within the core 1102 are smaller than the actual data cache sizes of the core 1102 and might execute faster if the data were cached. Thus, for example, the core 1102 may be configured to cache data specified by load/store instructions that include a non-temporal data hint. Additionally, the number of load buffers within the core 1102 that are available to load/store instructions that include a non-temporal data hint may be configured.

Another configuration setting selectively configures a hardware page directory cache (PDC) of the core 1102 to contain either page directory entries (PDE) or fourth-level page table (PML4) entries.

Another configuration setting selectively configures whether both, one or none of data and code TLB entries are placed into the L2 TLB of the core 1102. Another configuration setting configures the size of the L2 TLB.

Another configuration setting selectively configures whether a software prefetch line allocation is ensured. That is, the MMU may be configured to wait to complete until it either hits or has pushed a request for the line or even complete but continue to try to allocate the line in the wake.

Another configuration setting configures whether self-modifying code (SMC) detection is enabled or disabled. Additionally, if SMC detection is enabled, the core 1102 may be configured to correct early or late, and to perform a full machine flush or not.

Another configuration setting configures whether various parallel arbitrations in the load and/or store pipelines of the core 1102 are enabled or disabled. For example, a load effective address (LEA) generation in the store pipeline does not need to arbitrate for the entire pipeline because it produces the result early, so the core 1102 may be configured to allow another operation that requires the full pipeline to arbitrate at the same time. Furthermore, the load pipeline may be selectively configured to allow arbiters that do not need to read the cache to arbitrate in parallel with those that do.

Another configuration setting configures the degree of speculation regarding write-combine loads. For example, the write-combine loads may be fully speculative, speculative but still in order, or non-speculative. A similar configuration may be made with respect to loads associated with the x86 MOVNTDQA instruction.

Another configuration setting configures the MMU to disable or enable whether the MMU indicates to an instruction scheduler of the core 1102 that after a load miss has required newer micro-operations to replay, the load is likely to complete now. This allows the scheduler to speculatively schedule dependent micro-operations to line up with the load result forwarding stage rather than waiting for the result to be provided before scheduling. This is a speculation that the load will now have a valid result, but if not, another replay is required.

Another configuration setting configures forwarding paths of the core 1102 to selectively disable forwarding. This configuration setting may be particularly helpful in avoiding a design bug that is detected subsequent to design of the core 1102 and which might otherwise manifest itself when a specific program portion is executed by the core 1102. Examples of forwarding that may be selectively disabled include, but are not limited to, register result forwarding and load-store forwarding.

Another configuration setting causes the register renaming unit to flush queues that hold load-store dependencies that are used by the register renaming unit to affect load instruction scheduling in order to reduce load replays caused by load-store collisions. Generally, the functional units 1228 may be dynamically reconfigured to flush accumulated performance feature state that is known or suspected to be false or malformed in association with a specific program portion.

Another configuration setting causes one or more cache lines, or an entire cache memory, to be flushed in order to avoid a potential data incoherency. This may be particularly helpful in avoiding a design bug might otherwise manifest itself when a specific program portion is executed by the core 1102.

Another configuration setting temporarily changes the behavior of microcode that implements an architectural instruction for a specific instance of the architectural instruction. For example, the microcode executes an alternate code path in the specific instance of the architectural instruction, such as included in a specific program portion, and executes a normal code path in other instances of the architectural instruction. Again, this may be particularly helpful in avoiding a design bug.

The configuration unit 1204 writes the configuration setting to the configuration registers 1224 to reconfigure the dynamically configurable functional units 1228 of the core 1102 as well as other portions of the system 100. In one embodiment, the configuration unit 1204 comprises microcode executed by the core 1102 that performs the write of the configuration setting to the configuration registers 1224.

It should be understood that not all functional units of the core 1102 are dynamically reconfigurable nor are all portions of the system 100. It should also be understood that when the configuration unit 1204 reconfigures the dynamically configurable functional units 1228, it may not write to every configuration register 1224 and every dynamically configurable functional unit 1228 may not be reconfigured, although at least one configuration register 1224 will be written and at least one dynamically configurable functional unit 1228 will be reconfigured.

One use of embodiments of dynamic reconfiguration of a processing core 1102 described herein is to improve the performance and/or reduce the power consumption of the core 1102 and/or system 100 when executing known programs or program characteristics whose performance and/or power consumption may be significantly affected by dynamically reconfiguring the core 1102 to known configurations.

Another use of dynamic reconfiguration embodiments described herein is to prevent the core 1102 and/or system 100 from functioning incorrectly when it processes a portion of a program which, if the program portion were executed by the core 1102 while in a first know configuration, will result in a functional error but which, if executed by the core 1102 while in a second known configuration, will result in a correct result. For example, the core 1102 may produce a functional error if it executes the program portion when the data prefetcher is configured to perform a particularly aggressive mode of data prefetching; whereas, the core 1102 does not produce the functional error when it executes the program portion when the data prefetcher is configured to perform a less aggressive mode of data prefetching or data prefetching is turned off entirely. Examples of functional errors include, but are not limited to, corrupt data, a hang condition such as a deadlock or livelock, inordinately slow performance, and an exception condition the operating system is not prepared to remedy. The bug in the design of the core 1102 that causes the functional error may not have been discovered until after the core 1102 was manufactured in large volumes and/or after it was already shipped to consumers. In such cases, it may be advantageous to fix the problem by dynamically reconfiguring the core 1102 rather than redesigning the core 1102 and/or recalling or not selling the parts that have the bug.

An advantage of the embodiments described herein is that they provide full anonymity to the users. Indeed, the analysis performed by the server 104 only needs to know the configuration settings, the performance while executing with the configuration, and the program that was executing (or distinguishing characteristics thereof), but does not care which system the information came from or who was using it. Unlike much contemporary data mining, the embodiments described herein provide user anonymity and therefore may motivate a significant number of users to opt-in to the experiment and thereby receive improved performance benefits.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A server comprising a program of instructions running on at least one computer and configured to communicate with a plurality of remote systems, each of which is configured to receive at least one of a plurality of selectable types of updates from the server, the selectable types including a diagnostically-derived best-performing configuration settings type and an experimental configuration settings type, the server:
   receiving diagnostic information from the plurality of remote systems, wherein each remote system includes functional units that are dynamically configurable during operation of the remote system, wherein the diagnostic information from each remote system of the plurality of remote systems includes a configuration setting for the remote system and performance data collected while executing a program when the functional units are configured according to the configuration setting respective to the remote system;
   analyzing the received diagnostic information to determine the diagnostically-derived best-performing configuration setting of the configuration settings included in the diagnostic information received from the plurality of remote systems;
   generating one or more experimental configuration settings that are modifications of the determined best-performing configuration, wherein the modified configuration settings are distinct from the configuration settings received by the server from the plurality of remote systems;

sending the determined best-performing configuration setting to update a first subset of the plurality of remote systems that have selected to be updated with diagnostically-derived best-performing configuration settings;

sending one or more experimental configuration settings to update a second subset of the plurality of remote systems that have selected to receive such experimental configuration settings;

iterating on receiving the information from the plurality of systems, analyzing the received information, determining a new best-performing configuration setting, generating a new experimental configuration setting based on the new best-performing configuration setting, and providing the new best-performing configuration setting and new experimental configuration setting to the plurality of remote systems; and enabling users of the plurality of remote systems to select whether to receive updates with diagnostically-derived best-performing configuration settings or participate in testing of experimental configuration settings, while providing users who do not select to participate in testing of experimental configuration settings to receive updated configuration settings that are derived from other users' testing of experimental configuration settings.

2. The server of claim 1, wherein the best-performing configuration setting of a current iteration is determined as the better performing of the new configuration setting and the best-performing configuration of a previous iteration.

3. The server of claim 1, further comprising:
providing the determined best-performing configuration in response to receiving a request from a system for the determined best-performing configuration.

4. The server of claim 3, wherein the request includes data that specifies a program for which the system is requesting the new configuration.

5. The server of claim 4, wherein the data that specifies the program comprises a name of the program.

6. The server of claim 4, wherein the data that specifies the program comprises characteristics of the program.

7. The server of claim 6, wherein the characteristics of the program include patterns of memory accesses made by the program.

8. The server of claim 6, wherein the characteristics of the program include quantities of different types of instructions used by the program.

9. The server of claim 6, wherein the characteristics of the program include information related to effectiveness of data prefetcher functional units of the system during execution of the program.

10. The server of claim 1, wherein the information includes no data that identifies the systems or users of the systems.

11. The server of claim 1, wherein the diagnostic information is received and the new configuration settings are provided via the Internet.

12. The server of claim 1, wherein the plurality of systems is greater than ten thousand systems.

13. The server of claim 1, wherein the best-performing configuration setting is determined based on speed of the system.

14. The server of claim 1, wherein the best-performing configuration setting is determined based on power consumption of the system.

15. The server of claim 1, wherein the best-performing configuration setting is determined based on a combination of speed and power consumption of the system.

16. A method, comprising:
receiving diagnostic information from a plurality of remote systems, wherein:
each remote system includes functional units that are dynamically configurable during operation of the system;
each remote system is configured to receive at least one of a plurality of selectable types of updates from the server;
the selectable types include a diagnostically-derived best-performing configuration settings type and an experimental configuration settings type; and
the diagnostic information from each remote system of the plurality of remote systems includes a configuration setting for the remote system and performance data collected while executing a program when the functional units are configured according to the configuration setting respective to the remote system;
analyzing the received diagnostic information to determine the diagnostically-derived best-performing configuration setting of the configuration settings included in the diagnostic information received from the plurality of remote systems;
generating one or more experimental configuration settings that are modifications of the determined best-performing configuration, wherein the modified configuration settings are distinct from the configuration settings received from the plurality of remote systems;
sending the determined best-performing configuration setting to update a first subset of the plurality of remote systems that have selected to be updated with diagnostically-derived best-performing configuration settings;
sending one or more experimental configuration settings to update a second subset of the plurality of systems that have selected to receive such configuration settings; and
iterating on said receiving, said analyzing, and said sending of the determined best-performing and experimental configuration settings;
wherein the method enables users of the plurality of remote systems to select whether to receive updates with diagnostically-derived best-performing configuration settings or participate in testing of experimental configuration settings, while providing users who do not select to participate in testing of experimental configuration settings to receive updated configuration settings that are derived from other users' testing of experimental configuration settings.

17. The method of claim 16, wherein said analyzing comprises determining as the best-performing configuration setting of a current iteration the better performing of the new configuration setting and the best-performing configuration of a previous iteration.

18. The method of claim 16, further comprising:
receiving a request from a system for the determined best-performing configuration; and
wherein said sending the determined best-performing configuration is performed in response to said receiving the request.

19. The method of claim 18, wherein the request includes data that specifies a program for which the system is requesting the new configuration.

20. The method of claim 19, wherein the data that specifies the program comprises a name of the program.

21. The method of claim 19, wherein the data that specifies the program comprises characteristics of the program.

22. The method of claim 21, wherein the characteristics of the program include patterns of memory accesses made by the program.

23. The method of claim 21, wherein the characteristics of the program include quantities of different types of instructions used by the program.

24. The method of claim 21, wherein the characteristics of the program include information related to effectiveness of data prefetcher functional units of the system during execution of the program.

25. The method of claim 16, wherein the information includes no data that identifies the systems or users of the systems.

26. The method of claim 16, wherein said receiving and providing are performed via the Internet.

27. The method of claim 16, wherein the plurality of systems is greater than ten thousand systems.

28. The method of claim 16, wherein said analyzing comprises determining the best-performing configuration setting based on speed of the system.

29. The method of claim 16, wherein said analyzing comprises determining the best-performing configuration setting based on power consumption of the system.

30. The method of claim 16, wherein said analyzing comprises determining the best-performing configuration setting based on a combination of speed and power consumption of the system.

* * * * *